No. 718,825. PATENTED JAN. 20, 1903.
S. E. DAVIS.
DISK DRILL.
APPLICATION FILED JUNE 21, 1902.
NO MODEL. 3 SHEETS—SHEET 1.
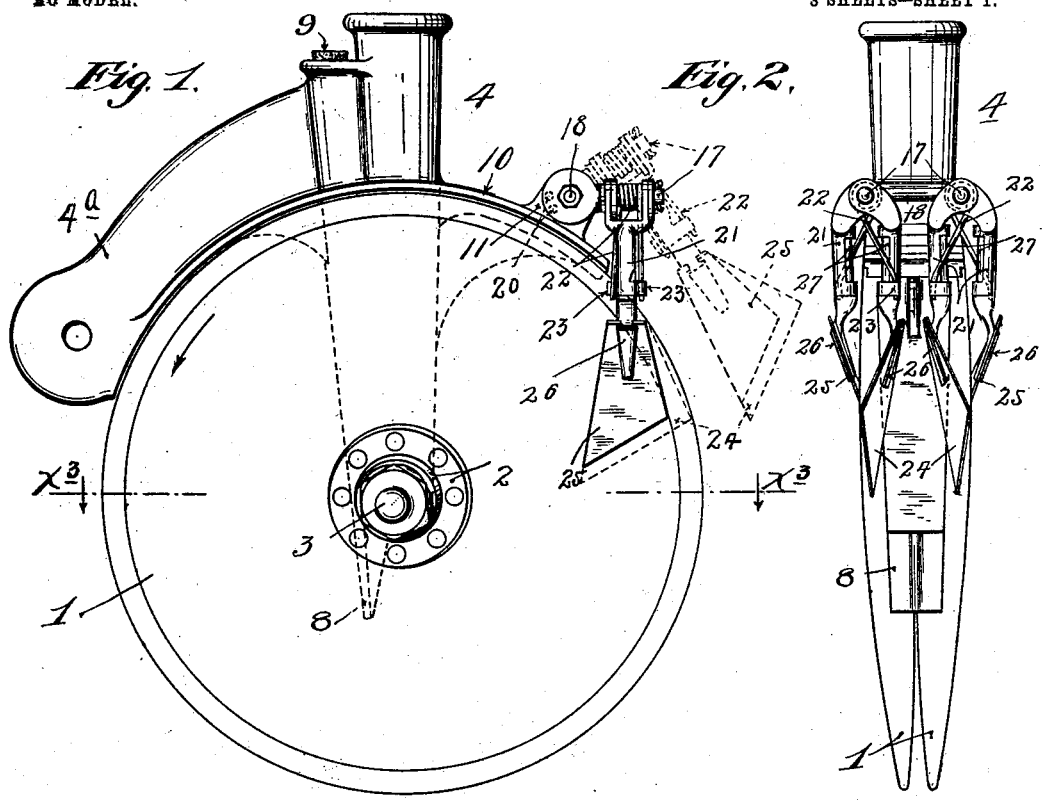
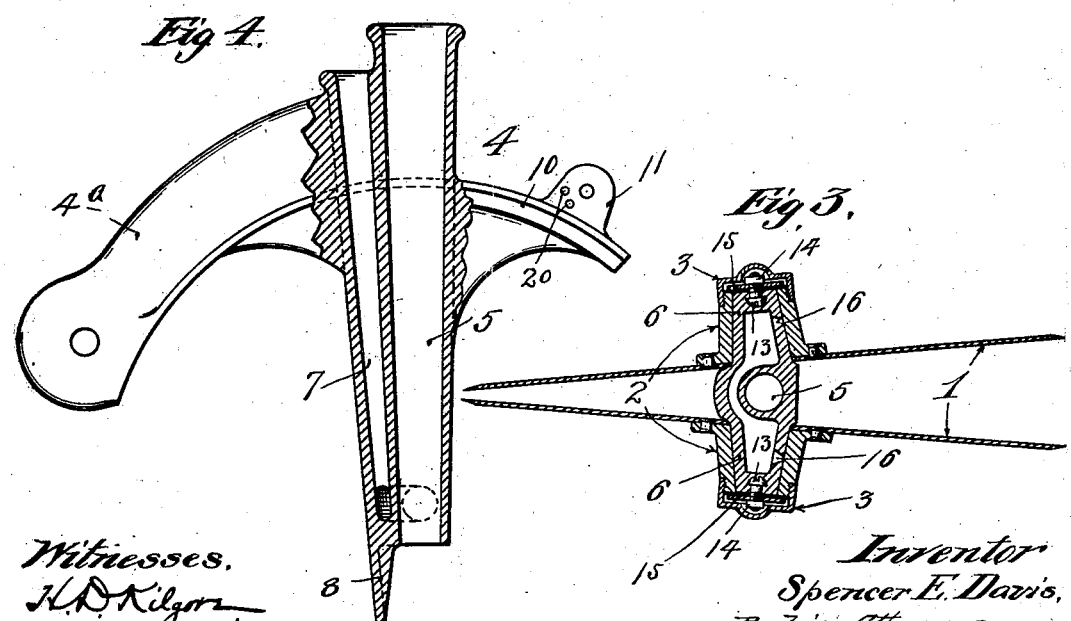
Witnesses.
H. D. Kilgore
E. H. Kitchen
Inventor
Spencer E. Davis,
By his Attorneys.

No. 718,825. PATENTED JAN. 20, 1903.
S. E. DAVIS.
DISK DRILL.
APPLICATION FILED JUNE 21, 1902.
NO MODEL. 3 SHEETS—SHEET 2.
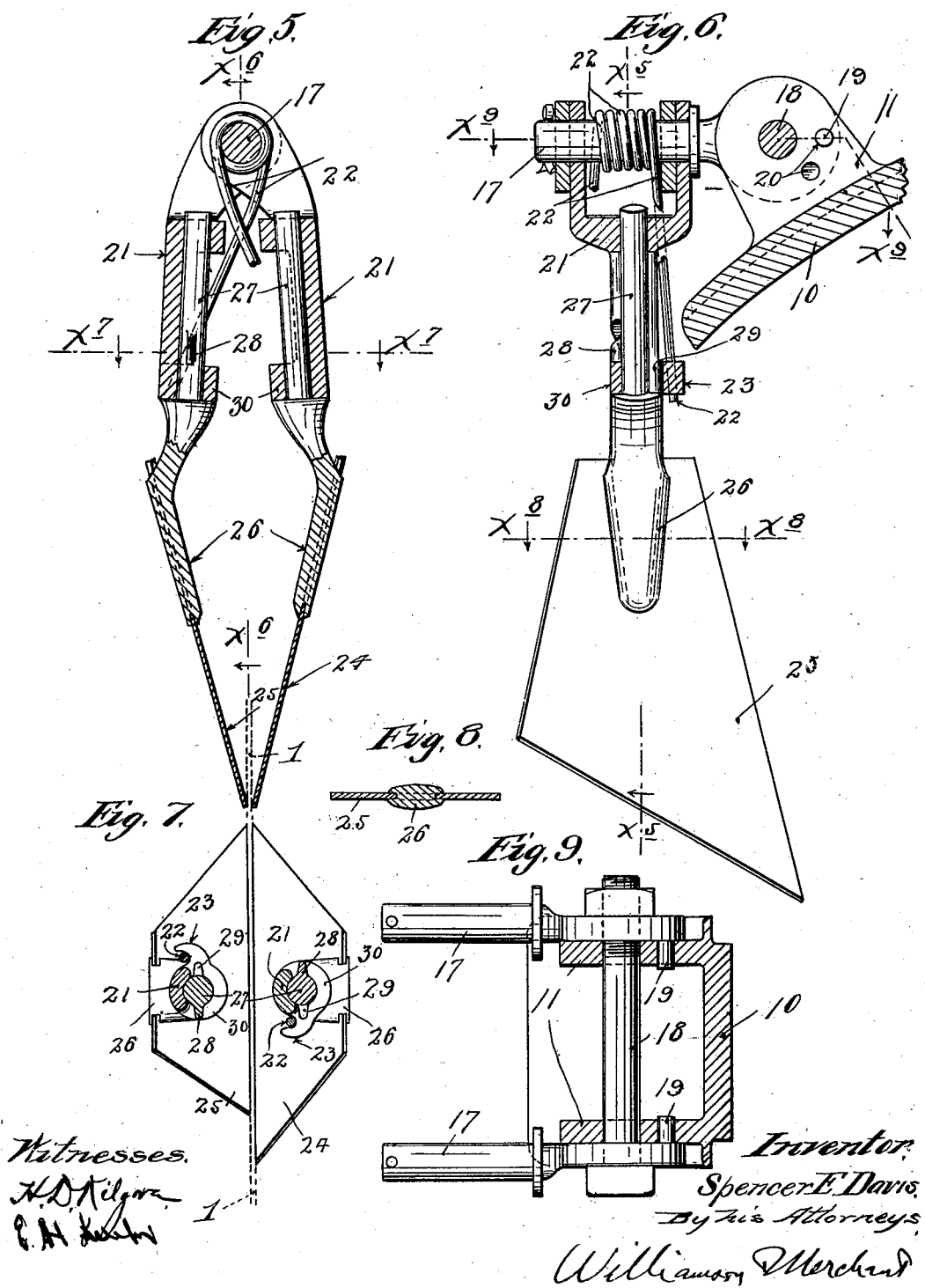

No. 718,825. PATENTED JAN. 20, 1903.
S. E. DAVIS.
DISK DRILL.
APPLICATION FILED JUNE 21, 1902.
NO MODEL. 3 SHEETS—SHEET 3.
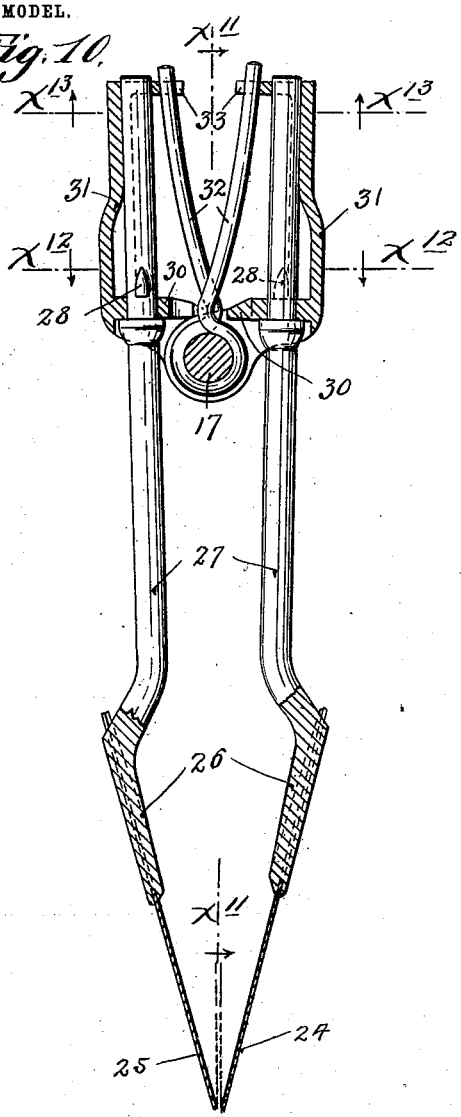
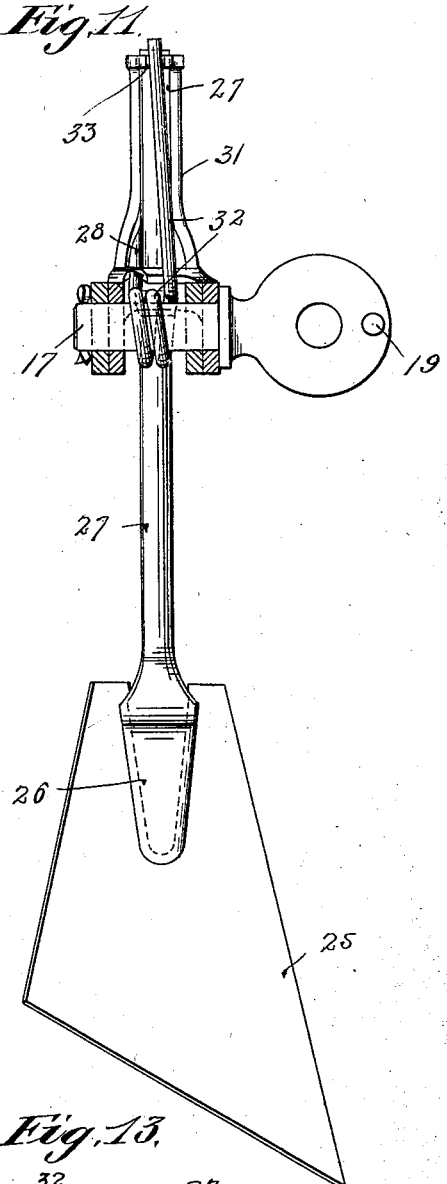
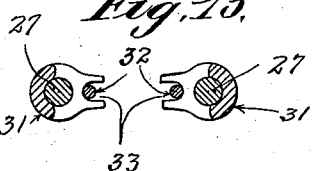
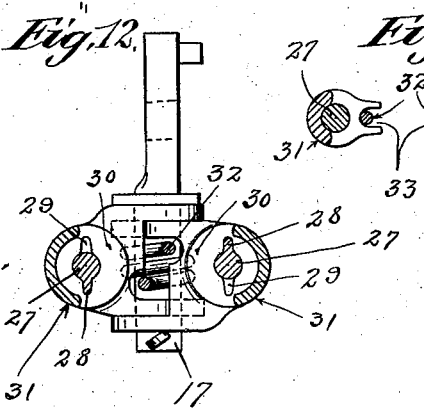
Witnesses.
H. D. Kilgord
E. H. Kulcher
Inventor,
Spencer E. Davis,
By his Attorneys,
William Merchant

UNITED STATES PATENT OFFICE.

SPENCER E. DAVIS, OF MINNEAPOLIS, MINNESOTA.

DISK DRILL.

SPECIFICATION forming part of Letters Patent No. 718,825, dated January 20, 1903.

Application filed June 21, 1902. Serial No. 112,585. (No model.)

*To all whom it may concern:*

Be it known that I, SPENCER E. DAVIS, a citizen of the United States, residing at Minneapolis, in the county of Hennepin and State of Minnesota, have invented certain new and useful Improvements in Disk Drills; and I do hereby declare the following to be a full, clear, and exact description of the invention, such as will enable others skilled in the art to which it appertains to make and use the same.

My present invention relates to disk drills, and has for its objects to provide, first, an improved scraper for clearing the disks of mud and dirt, and, second, to provide an improved form of boot whereby certain improved actions are obtained.

To the above ends the invention consists of the novel devices and combinations of devices hereinafter described, and defined in the claims.

The invention is illustrated in the accompanying drawings, wherein like characters indicate like parts throughout the several views.

Figure 1 is a view in side elevation showing a boot, disks, and scrapers and embodying the several features of my invention. Fig. 2 is a rear elevation of the same. Fig. 3 is a horizontal section on the line $x^3$ $x^3$ of Fig. 1. Fig. 4 is a view principally in side elevation, but with some parts in central vertical section, showing the improved boot with other parts detached therefrom. Fig. 5 is a transverse vertical section taken through one of the improved scraping devices on the line $x^5$ $x^5$ of Fig. 6, some parts being left in full. Fig. 6 is a section on the line $x^6$ $x^6$ of Fig. 5. Fig. 7 is a horizontal section on the line $x^7$ $x^7$ of Fig. 5. Fig. 8 is a horizontal section on the line $x^8$ $x^8$ of Fig. 6. Fig. 9 is a detail view in transverse section on the irregular line $x^9$ $x^9$ of Fig. 6, some parts being removed. Fig. 10 is a view corresponding to Fig. 5, but illustrating a somewhat modified form of the scraping device. Fig. 11 is a section on the line $x^{11}$ $x^{11}$ of Fig. 10, some parts being left in full. Fig. 12 is a horizontal section on the line $x^{12}$ $x^{12}$ of Fig. 10, and Fig. 13 is a section on the line $x^{13}$ $x^{13}$ of Fig. 10 looking upward.

The numeral 1 indicates the disks, which are of ordinary construction, provided at their centers with outwardly-projecting hubs 2, the outer ends of which are normally closed by detachable caps 3.

The boot, which is indicated as an entirety by the numeral 4, is provided with a vertically or approximately vertically extended tubular grain-spout 5, from the lower end and sides of which project trunnions 6, which taper outward and the axes of which diverge slightly forward at the proper angle to bring the disks 1 into proper operative relations. This grain-spout 5, it may be noted, extends to a point below the trunnions 6 and passes through the axes of said trunnions.

The trunnions 6 are hollow and the chambers therein communicate with an oil tube or duct 7, formed in the boot 4 and extending vertically just forward of the grain-spout 5, as best shown in Figs. 3 and 4. A guard web or scraper 8 depends from the lower end of the spout 5 just forward of the vertical passage therethrough for an important purpose, to be hereinafter noted. The upper end of the oil-tube 7 would normally be closed by a cork or other stopper 9.

The boot 4 is provided with a segmental forwardly-projecting arm 4ª, to which one of the drag-bars of the drill would be connected in the ordinary way. The boot is further provided with a segmental rear projection 10, provided with a pair of heavy ears 11, to which the scraping devices are connected in a manner presently to be noted.

The hubs 2 of the disks 1 of course work loosely on the trunnions 6. They are shown as held against endwise displacements as follows: The heads of small nutted screws 13 are cast rigidly into the ends of the trunnions 6, with the screw-threaded ends thereof projecting outward on the axes of the said trunnions. Nuts 14 work on the ends of said screws 13, and between the said nuts and the ends of the trunnions are clamped retaining-washers 15, which embrace the ends of the hubs 2 and hold the same and the disks 1 against lateral movements, while permitting them to freely turn. Small lateral perforations 16 open through the sides of the trunnions 6 and serve to deliver oil in limited quantities from the interior chambers of the said trunnions to the journal-bearings between said trunnions and hubs 2. The caps 3, which close the outer ends of the trunnions 2, inclose the nuts 14 and washers 15 and prevent the escape of oil from the ends of the hubs.

To each of the two ears 11 is pivoted the flat head of a rearwardly-projecting trunnion 17, which pivotal connection is preferably made by a nutted bolt 18, as best shown in Fig. 9. The heads of these trunnions are provided with pins 19, which are adapted to be engaged with either of two seats 20 to rigidly hold the said trunnions and the scrapers, presently to be described, in either of the two positions indicated in Fig. 1.

On each of the trunnions 17 is pivotally mounted the upper ends of a pair of coöperating arms or socket members 21. The upper ends of these arms 21 are preferably bifurcated, and they are yieldingly pressed toward each other by a strong spring 22, coiled around the coöperating trunnion 17, with its end pressing against lugs 23 on the said arms, as best shown in Figs. 5 and 6.

The scraper-blades 24 and 25 are preferably formed of flat pieces of metal cut on an incline to a horizontal at their lower ends and provided at their upper ends with tapered notches, into which are frictionally pressed the tapered and grooved lower ends of blade-holders 26. The blade-holders 26 are provided with stems 27, which are swiveled in suitable seats formed in the corresponding arms or sockets 21. The stems 27 are provided with lugs 28, which when turned into registration with notches 29, formed in the lower lug portions 30 of the arms 21, permit the holders 26 to be readily placed in working position or removed by endwise movement. However, the said lugs 28 can be brought into registration with the notches 29 only when the holders 26 and blades 24 are turned out of operative positions. In all other positions the lugs 28 engage with the tops of the lugs 30 and maintain the said holders 26 in operative positions, with freedom, however, for a swiveling movement to adapt the scraper always to the faces of the disks.

The scrapers 24 engage the inner and the scrapers 25 the outer faces of the disks 1, and since the disks are beveled on their outer faces the scrapers 24 are preferably made wider than the scrapers 25.

So far as I am aware all spring-pressed scrapers hitherto employed for this purpose put lateral or sidewise pressure upon the disks, and thereby put greatly-increased frictional engagement both between the disk-hubs and supporting-trunnions of the boot and between the sides of the disk and other parts of the boot or parts rigidly supported by the boot. Hence it is evident that my improved scraper will cause the disk to run more easily and the disk drill to be more easily drawn.

Whenever desired, the scrapers may be rendered inoperative and locked in operative positions by moving them into the positions indicated by dotted lines in Fig. 1, as heretofore described. As is evident, to move the scrapers from the one position into the other (indicated in Fig. 1) requires the nut of the bolt 18 to be loosened and again tightened after the pins 19 have been engaged with the proper seats 20.

The scrapers are so located that they will be protected from corn-stubble and other obstacles by the projecting hubs of the disks, and they are also so located that they leave the rear of the disks open to view and for the ejection of mud. The lower ends of the scraper-blades are beveled, so that they will cut the mud loose from the disks with a shearing action and turn the same rearward.

As the seeds are dropped vertically between the trunnions of the boot they will fall to the deepest portion of the furrow, and at the same time the seed-spout is so located that it will not be filled by upwardly-moving mud carried by the disks, as would be the case if the said spout were to be located farther back or to the rear of the trunnions. Furthermore, the depending guard web or scraper 8 serves to clean those portions of the disks which move in a circle, including the lower end of said seed-spout. Again, the seed-spout is carried downward to a point where the seed-delivery hose or flexible tube (not shown, but which would be telescoped into the seed-tube 5) need not project below the said spout 5, and hence is protected thereby. Again, the seeds are dropped to the very bottom of the furrow, but far enough forward, so that they will not be raised or lifted up by the rear portions of the disks, which rear portions of course constantly move upward. Again, it is important to note that the scrapers may be thrown into inoperative positions and there held without removing them from their supports. This is important, since it is desirable to throw the scrapers out of action whenever the drill is used in dry soil.

The form of scraper illustrated in Figs. 11 to 13, inclusive, is very much the same as that illustrated in the other views; but the stems 27 of the blade-holders 26 are made longer and are swiveled in levers or socket members 31, which correspond to the levers 21, but are turned upward and are subject to a spring 32 of very much the same form as that used in the before-described construction. In this construction the stems 27 are provided with the lugs 28, and the levers 31, like the levers 21, are provided with coöperating notches 29. In this construction, as shown, the upper ends of the spring 32 engage with notches 33, formed in the upper ends of the arms or socket members 31.

What I claim, and desire to secure by Letters Patent of the United States, is as follows:

1. In a device of the character described, the combination with a disk, of a pair of coöperating scrapers yieldingly pressed against the opposite faces of the same disk, the one serving as a base of reaction for the other, substantially as described.

2. In a device of the character described, the combination with a pivotally-movable trunnion, of a pair of spring-pressed arms freely pivoted thereon, a pair of scraper-holders swiveled in said arms, and a pair of scraper-blades held by said holders and engageable with the opposite faces of the same disk, which scrapers, by pivotal movements of said trunnions, are movable to and from operative positions, substantially as described.

3. In a device of the character described, the combination with a rearwardly-projecting trunnion mounted for pivotal movements and adapted to be held in different adjustments by pin-and-seat engagement, a pair of supporting-arms pivoted on said trunnion, a spring reacting against said two arms and tending to press the same together, scraper-holders swiveled in said supporting-arms, and scraper-blades held by said holders and, under the action of said spring, yieldingly pressed against the opposite faces of the same disks, substantially as described.

4. In a disk drill, the combination with a boot having laterally-projecting trunnions and a seed-spout passing vertically through the boot between the said trunnions and diametrically of said trunnions, of disks mounted on said trunnions, substantially as described.

5. The combination with a disk, of a scraper therefor comprising the spring-pressed and pivoted supporting-arm, and a scraper-blade having a holder swiveled in the said arm and normally held against endwise movement therein by a lug on one of the parts and a notch in the other, which lug and notch may be engaged only when said blade is turned into an inoperative position, substantially as described.

In testimony whereof I affix my signature in presence of two witnesses.

SPENCER E. DAVIS.

Witnesses:
ELIZABETH H. KELIHER,
F. D. MERCHANT.